United States Patent
Bowen

(10) Patent No.: US 6,371,878 B1
(45) Date of Patent: Apr. 16, 2002

(54) ELECTRIC CONTINUOUSLY VARIABLE TRANSMISSION

(75) Inventor: Thomas C. Bowen, Rochester Hills, MI (US)

(73) Assignee: New Venture Gear, Inc., Troy, MI (US)

(*) Notice: Subject to any disclaimer, the term of this patent is extended or adjusted under 35 U.S.C. 154(b) by 0 days.

(21) Appl. No.: 09/643,238

(22) Filed: Aug. 22, 2000

(51) Int. Cl.[7] .................................................. B60K 6/02
(52) U.S. Cl. .................................................. 475/5; 180/65.7
(58) Field of Search ............................ 475/5; 180/65.2, 180/65.7

(56) References Cited

U.S. PATENT DOCUMENTS

| | | | | |
|---|---|---|---|---|
| 5,558,589 A | * | 9/1996 | Schmidt | 475/5 |
| 6,041,877 A | | 3/2000 | Yamada et al. | 180/65.2 |
| 6,053,833 A | * | 4/2000 | Masaki | 475/5 |
| 6,083,138 A | | 7/2000 | Aoyama et al. | 477/5 |
| 6,083,139 A | | 7/2000 | Deguchi et al. | 477/5 |
| 6,090,005 A | * | 7/2000 | Schmidt et al. | 475/5 |
| 6,098,733 A | | 8/2000 | Ibarak et al. | 180/65.2 |
| 6,110,066 A | | 8/2000 | Nedungadi et al. | 475/5 |

* cited by examiner

Primary Examiner—Sherry Estremsky
(74) Attorney, Agent, or Firm—Harness, Dickey & Pierce P.L.C.

(57) ABSTRACT

An electric continuously variable transmission includes first and second planetary splitters each having a corresponding electric motor/generator. Both planetary splitters are integrally linked to an input shaft which transfers torque and rotational motion from a combustion engine. The electric motor/generators switch between driving its corresponding planetary splitter and being driven by its corresponding planetary splitter to generate various ranges, providing variable transmission speed ratios. A lock-up clutch may be selectively engaged producing an overdrive range for cruising speeds. The electric continuously variable transmission drives a first differential which further drives a pair of wheels. A controller and battery are also provided for respectively managing the various electric motor/generators and either storing or providing energy for the system. Implementation of the electric continuously variable transmission in a hybrid vehicle is also possible with the addition of a second differential and a third electric motor/generator for driving the second differential.

13 Claims, 2 Drawing Sheets

ELECTRIC CONTINUOUSLY VARIABLE TRANSMISSION

FIELD OF THE INVENTION

The present invention relates generally to transmissions and more particularly to an electric continuously variable transmission for improving hybrid vehicle efficiency.

BACKGROUND OF THE INVENTION

The powertrains of conventional vehicles are designed to provide more power than required for the vehicle at cruising speeds. Specifically, the engine of conventional vehicles is larger than required to provide power for acceleration and hill climbs. This extra power is not required once the vehicle is at cruising speed. As a result, conventional vehicle powertrains are inefficient.

Therefore, it is desirable to have an improved vehicle powertrain for implementation in a vehicle, such as a hybrid vehicle, which overcomes inefficiencies inherent in a conventional powertrain.

Additionally, various types of continuously variable transmissions (CVTs) have been developed throughout the years. The object of a CVT is to provide a continuously variable drive ratio from a transmission enabling an engine to run at an optimum point on a brake specific fuel consumption curve. Essentially, CVTs aim at improving engine efficiency by enabling the engine to continuously run at its most efficient point. Due to the significant complexity, traditional CVTs have posed problems in both implementation and application. Traditional belt drive-type CVTs are also inefficient in that significant parasitic losses occur in achieving continuously variable transmission ratios. Moreover, such devices are power limited.

Therefore, it is desirable in the industry to provide an improved CVT for implementation in a vehicle, such as a hybrid vehicle, which overcomes the deficiencies of traditional CVTs.

SUMMARY OF THE INVENTION

In achieving the above identified objectives, the present invention provides an electric continuously variable transmission comprising an input shaft and an output shaft in mechanical communication with first and second planetary splitters. A first electric motor/generator selectively drives the first planetary splitter or generates electrical energy from the first planetary splitter. A second electric motor/generator selectively drives the second planetary splitter or generates electrical energy from the second planetary splitter. A lock-up clutch or brake is in mechanical communication with the first planetary splitter for selectively locking a sun gear of the first planetary splitter. A low range is achieved by feeding electrical energy from the second electric motor/generator to the first electric motor/generator for driving the first planetary splitter. A mid range is achieved by feeding electrical energy from the first electric motor/generator to the second electric motor/generator for driving the second planetary splitter. A high range, or overdrive, is achieved by engaging the brake. Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art.

DETAILED DESCRIPTION OF THE PREFERRED EMBODIMENT

At the outset, it is important to note that the herein described embodiment is a preferred embodiment and merely exemplary in nature. Being exemplary, the preferred embodiment is in no way intended to limit the invention or its application.

Figure 1:
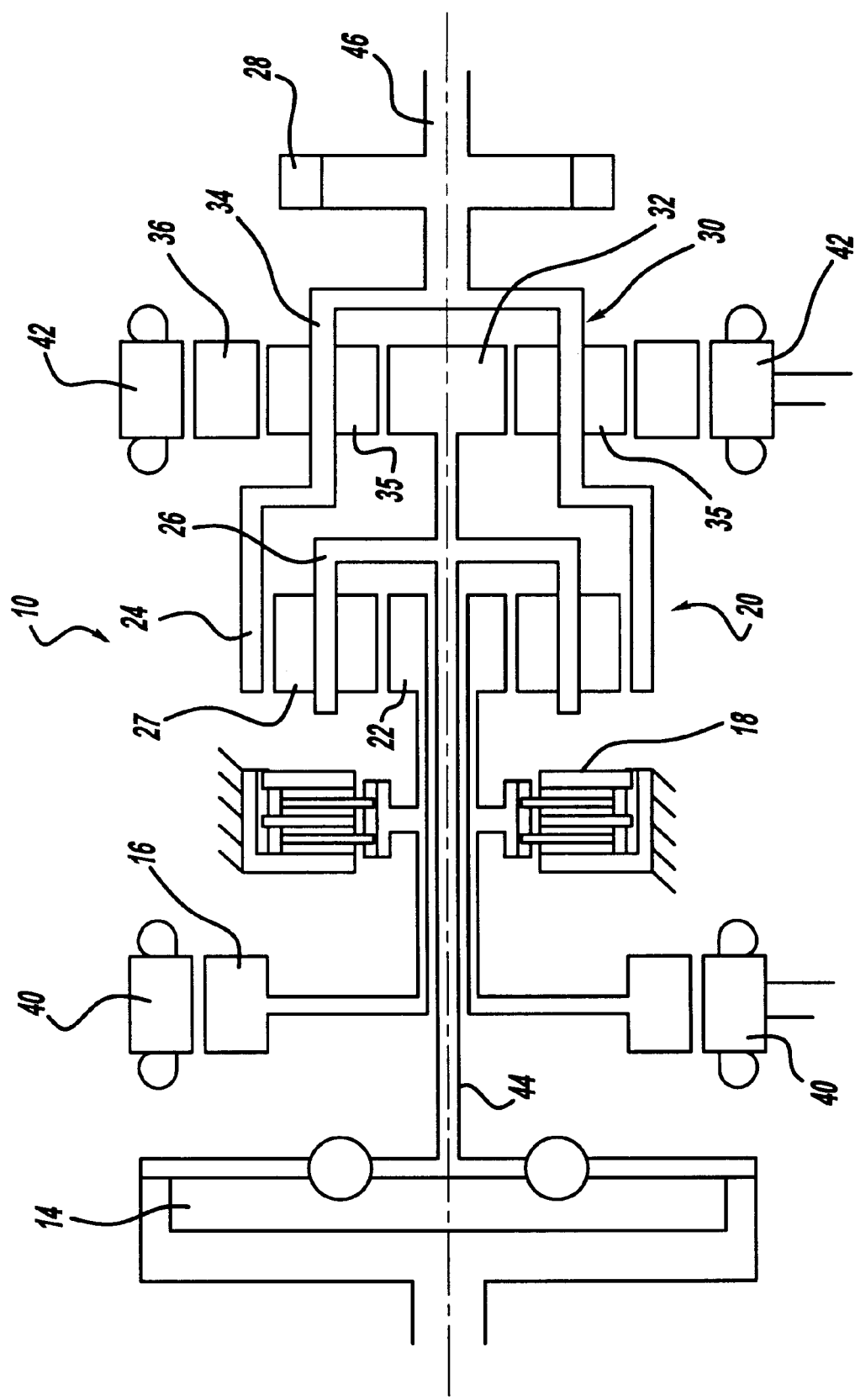
FIG. 1 is a schematic view of an electric continuously variable transmission according to the principles of the present invention.

With reference to FIG. 1, a schematic view of an electric continuously variable transmission (CVT) 10 is shown. Electric CVT 10 comprises a first planetary splitter 20, a second planetary splitter 30, a first electric motor/generator 40 operably coupled to first planetary splitter 20 and a second motor/generator 42 operably coupled to second planetary splitter 30. An input shaft 44 is externally driven by an engine 12 (see FIG. 2) through a connection 14. Connection 14 can be a conventional flywheel and vibration damper. Input shaft 44 is connected to a sun gear 32 of second planetary splitter 30 and a carrier 26 of first planetary splitter 20. A plurality of planet gears 27 are rotatably supported on carrier 26. A sun gear 22 of first planetary splitter 20 is connected to first electric motor/generator 40 and a lock-up clutch or brake 18. Brake 18 can be selectively engaged to prohibit rotation of sun gear 22. A ring gear 24 of first planetary splitter 20 is connected to a carrier 34 of second planetary splitter 30. Ring gear 24 is meshingly engaged with planet gears 27 which are also meshingly engaged with sun gear 22. A plurality of planet gears 35 are rotatably supported on carrier 34. Second electric motor/generator 42 is connected to a ring gear 36 of second planetary splitter 30. Ring gear 36 is meshingly engaged with planet gears 35 which are also meshingly engaged with sun gear 32. An output shaft 46 is connected to ring gear 24 and carrier 34. A parking pawl 28 is disposed on output shaft 46.

Figure 2:
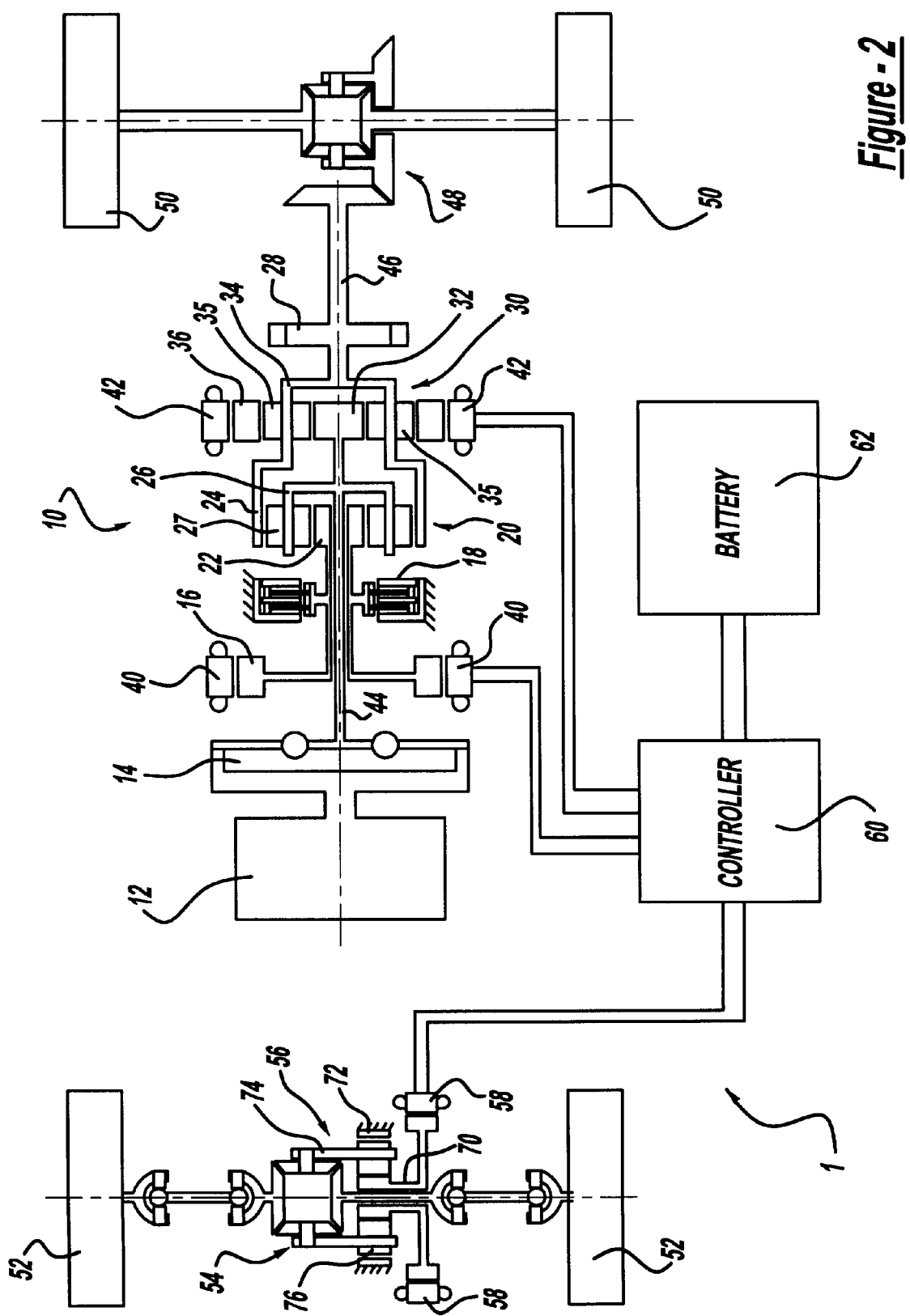
FIG. 2 is a schematic view of a hybrid vehicle implementing the electric continuously variable transmission according to the principles of the present invention.

Referencing FIG. 2, a hybrid vehicle powertrain 1 is shown having electric CVT 10 implemented therein. Output shaft 46 is connected to a rear differential 48 for driving rear differential 48, which in turn drives a pair of wheels 50. A controller 60 is in electrical communication with first and second electric motor/generators 40, 42 and a battery 62. Controller 60 manages the driving and generating modes of first and second electric motor/generators 40, 42, as well as managing the charge and discharge of battery 62. Battery 62 provides power for driving first and second electric motor/generators 40, 42 in their respective motor modes.

Hybrid vehicle powertrain 1 further comprises a front differential 54 for driving a pair of front wheels 52. Front differential 54 is driven by a third electric motor/generator 58 through a third planetary splitter 56. Third planetary splitter 56 includes a sun gear 70 connected to third motor/generator 58. A ring gear 72 of third planetary splitter 56 is fixed and a carrier 74 provides an input to differential 54. A plurality of planet gears 76 are rotatably mounted to carrier 74. Third electric motor/generator 58 is managed by controller 60 and powered by battery 62. It is anticipated, however, that electric CVT 10 could be configured to power front differential 54.

When hybrid vehicle powertrain 1 is stationary, ring gear 36 rotates opposite to the direction of rotation of input shaft 44, at a slower rotational speed. Ring gear 36 drives second electric motor/generator 42 in its generation mode. The electric energy which second electric motor/generator 42 develops is fed to first electric motor/generator 40. This event is termed "power recirculation". If enough electrical energy is developed, second electric motor/generator 42 may also feed electrical energy to third electric motor/generator 58 and/or battery 62. Once enough electrical energy has developed, a reaction torque, produced by second electric motor/generator 42, will drive hybrid vehicle powertrain 1 at low speed. This will simulate the feel of a conventional automatic transmission without the power loss associated with automatic transmissions.

As second electric motor/generator 42 absorbs more power, the rotational speed of ring gear 36 slows and hybrid vehicle powertrain 1 accelerates. The preferred embodiment produces a planetary splitter low speed ratio of 5.30:1 when the rotational speed of ring gear 36 approaches zero. As the rotational speed of ring gear 36 passes zero, second electric motor 42 switches from a generator mode to a motor mode and first electric motor/generator 40 switches to a generator mode. First electric motor/generator 40 absorbs energy from first planetary splitter 20 for feeding electrical energy to second electric motor/generator 42, helping to drive hybrid vehicle powertrain 1 in a mid speed range operating mode. When the rotational speed of sun gear 22 and connected first electric motor/generator 40 approach zero, the preferred embodiment can produce an overdrive speed ratio of 0.77:1. Upon achieving this speed ratio, brake 18 is applied and all power from engine 12 is transferred mechanically providing maximum efficiency.

Reverse operation is achieved by second electric motor/generator 42 driving ring gear 36 faster in a reverse direction than engine 12 normally drives it. In other words, since engine 12 typically drives ring gear 36 in a direction opposite its own rotational direction, to achieve reverse, second electric motor/generator 42 must drive ring gear 36 in the same rotational direction as engine 12. A reverse speed ratio of 6.37:1 is achievable by the preferred embodiment.

It should also be noted that the preferred embodiment of electric CVT 10 should not be limited to application in hybrid vehicles. Electric CVT 10 is readily applicable in conventional combustion engine vehicles as well.

The invention being thus described, it will be obvious that the same may be varied in many ways. Such variations are not to be regarded as a departure from the spirit and scope of the invention. Such variations or modifications, as would be obvious to one skilled in the art, are intended to be included within the scope of the following claims.

What is claimed is:

1. A continuously variable transmission comprising:
   first and second planetary splitters;
   an input shaft in mechanical communication with each of said first and second planetary splitters;
   an output shaft in mechanical communication with each of said first and second planetary splitters;
   a first electric motor/generator for selectively driving or generating electrical energy from said first planetary splitters; and
   a second electric motor/generator for selectively driving or generating electrical energy from said second planetary splitter;
   wherein a low speed range operating mode is achieved through said second electric motor/generator generating electrical energy and feeding said electrical energy to said first electric motor/generator, a mid speed range operating mode is achieved through said first electric motor/generator generating electrical energy and feeding said electrical energy to said second electric motor/generator, and a high speed range is achieved through a lock-up clutch locking a component of said first planetary splitter and said second electric motor/generator generating electrical energy and feeding said electrical energy to said first electric motor/generator.

2. The continuously variable transmission of claim 1 wherein said output shaft is driven by a ring gear of said first planetary splitter and a carrier of said second planetary splitter.

3. The continuously variable transmission of claim 1 further comprising a controller for managing driving and generating modes of each of said first and second electric motor/generators.

4. The continuously variable transmission of claim 1 further comprising a battery for powering either of said first and second electric motor/generators.

5. A continuously variable transmission comprising:
   a first and second planetary splitters;
   a lock-up clutch in mechanical communication with said first planetary splitter;
   an input shaft in mechanical communication with each of said first and second planetary splitters;
   an output shaft in mechanical communication with each of said first and second planetary splitters;
   a first electric motor/generator for selectively driving or generating electrical energy from said first planetary splitter; and
   a second electric motor/generator for selectively driving or generating electrical energy from said second planetary splitter.

6. A continuously variable transmission comprising:
   first and second planetary splitters;
   an input shaft in mechanical communication with each of said first and second planetary splitters, wherein said input shaft drives a carrier of said first planetary splitter and a sun gear of said second planetary splitter;
   an output shaft in mechanical communication with each of said first and second planetary splitters;
   a first electric motor/generator for selectively driving or generating electrical energy from said first planetary splitter; and
   a second electric motor/generator for selectively driving or generating electrical energy from said second planetary splitter.

7. A hybrid vehicle comprising:
   a combustion engine;
   a continuously variable transmission operably attached to said combustion engine, and continuously variable transmission including:
   first and second planetary splitters;
   an input shaft in mechanical communication with each of said first and second planetary splitters;
   an output shaft in mechanical communication with each of said first and second planetary splitters;
   a first electric motor/generator for selectively driving or generating electrical energy from said first planetary splitter;
   a second electric motor/generator for selectively driving or generating electrical energy from said second planetary splitter;
   a first differential driven by said continuously variable transmission wherein said first differential drives a first pair of wheels;

a second differential connected to a second pair of wheels for driving said second pair of wheels;

a third electric motor/generator for driving said second differential; and a battery for powering said first, second and third electric motor/generators and for storing energy produced by said first, second and third motor/generators when said first, second and third electric motor/generators are selectively operated in a power generation mode.

8. The hybrid vehicle of claim 7, further comprising a controller for managing said first, second and third electric motor/generators.

9. The hybrid vehicle of claim 7 wherein said input shaft drives a carrier of said first planetary splitter and a sun gear of said second planetary splitter.

10. The hybrid vehicle of claim 7 wherein said output shaft is driven by a ring gear of said first planetary splitter and a carrier of said second planetary splitter.

11. The hybrid vehicle of claim 7 further comprising a parking mechanism for engaging said output shaft.

12. A hybrid vehicle comprising:

a combustion engine;

a continuously variable transmission operably attached to said combustion engine, said continuously variable transmission including:

first and second planetary splitters;

an input shaft in mechanical communication with each of said first and second planetary splitters;

an output shaft in mechanical communication with each of said first and second planetary splitters;

a first electric motor/generator for selectively driving or generating electrical energy from said first planetary splitter;

a second electric motor/generator for selectively driving or generating electrical energy from said second planetary splitter; and a first differential driven by said continuously variable transmission wherein said first differential drives a first pair of wheels;

wherein a low speed range operating mode is achieved through said second electric motor/generator generating electrical energy and feeding said electrical energy to said first electric motor/generator, a mid speed range operating mode is achieved through said first electric motor/generator generating electrical energy and feeding said electrical energy to said second electric motor/generator, and a high speed range operating mode is achieved through a lock-up clutch locking a component of said first planetary splitter and said second electric motor/generator generating electrical energy and feeding said electrical energy to said first electric motor/generator.

13. A transmission for a hybrid vehicle having an internal combustion engine and a driveline, comprising:

an input shaft adapted to be selectively driven by the engine;

an output shaft adapted to drive the driveline;

a first planetary gearset having a first sun gear, a first ring gear, and a set of first planet gears meshed with said first sun gear and said first ring gear, said planet gears rotatably supported on a first carrier that is fixed to said input shaft;

a second planetary gearset having a second sun gear fixed to said input shaft, a second ring gear, and a set of second planet gears meshed with said second sun gear and second ring gear, said second planet gears rotatably supported from a second carrier fixed to said first ring gear and said output shaft;

a first motor/generator for selectively driving or generating electrical energy from said first sun gear;

a second motor/generator for selectively driving or generating electrical energy from said second ring gear;

an input clutch for selectively coupling the engine to said input shaft;

a brake for selectively braking rotation of said first sun gear; and a control system for controlling actuation of said first and second motor/generators, said input clutch and said brake.

* * * * *